(12) United States Patent
Stange et al.

(10) Patent No.: US 7,539,547 B2
(45) Date of Patent: May 26, 2009

(54) PLASTICS PROCESSING MACHINE

(75) Inventors: Bodo Stange, Thalmässig (DE); Oswald Dachs, Eckental (DE); Andreas Melkus, Oberndorf (AT)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 11/735,114

(22) Filed: Apr. 13, 2007

(65) Prior Publication Data

US 2007/0186144 A1 Aug. 9, 2007

Related U.S. Application Data

(63) Continuation of application No. PCT/EP2005/055045, filed on Oct. 6, 2005.

(30) Foreign Application Priority Data

Oct. 19, 2004 (DE) ............ 10 2004 051 106

(51) Int. Cl.
  G05B 11/01 (2006.01)
  G05B 15/00 (2006.01)
  B29C 39/00 (2006.01)
  B29C 45/00 (2006.01)

(52) U.S. Cl. ............ 700/17; 700/83; 700/197; 700/200

(58) Field of Classification Search ............ 700/17, 700/83, 197, 200
See application file for complete search history.

(56) References Cited

U.S. PATENT DOCUMENTS 5,539,650 A * 7/1996 Hehl ............ 700/200
5,550,744 A * 8/1996 Steinbichler ............ 700/206
6,073,059 A 6/2000 Hayashi et al.
6,275,741 B1 * 8/2001 Choi ............ 700/200
6,618,041 B2 * 9/2003 Nishizawa ............ 345/173
6,684,264 B1 * 1/2004 Choi ............ 710/15

(Continued)

FOREIGN PATENT DOCUMENTS

CN 1445071 7/2002

(Continued)

OTHER PUBLICATIONS

RFB Protocol; Wikipedia; 2 pages.*

(Continued)

*Primary Examiner*—Ronald D Hartman, Jr.
(74) *Attorney, Agent, or Firm*—Henry M. Feiereisen; Ursula B. Day

(57) ABSTRACT

A plastics processing machine, particularly an injection molding machine, with an operating unit, a machine controller, and a subsystem having its own dedicated control unit is described. The machine controller and control device each generate a screen display and can be operated via the screen display. The operating unit is connected or can be connected for data transmission to both the machine controller and the control unit. Both of the machine controller and the control unit can be monitored and controlled by reproducing the original screen output from the machine controller and the control unit on the display screen of the operating unit, where new information can be entered. The information entered on the display screen of the operating unit is then transmitted back to the corresponding controller or unit associated with the reproduced screen display where the information was entered.

15 Claims, 3 Drawing Sheets

U.S. PATENT DOCUMENTS

| | | | |
|---|---|---|---|
| 6,925,354 B2 * | 8/2005 | Morwald et al. | 700/200 |
| 2002/0026264 A1 | 2/2002 | Choi | |
| 2004/0043092 A1 | 3/2004 | Dachs | |
| 2004/0088073 A1 | 5/2004 | Yamazaki et al. | |
| 2004/0093115 A1 * | 5/2004 | Usui et al. | 700/204 |

FOREIGN PATENT DOCUMENTS

| | | |
|---|---|---|
| DE | P1951208 | 12/1971 |
| DE | 4329886 A1 | 3/1995 |
| DE | 0916466 A1 | 5/1999 |
| DE | 20214899 U1 | 3/2003 |
| DE | 10246925 A1 | 4/2003 |
| DE | 10248030 A1 | 4/2003 |
| DE | 10310886 B3 | 9/2004 |
| EP | 0700767 A1 | 3/1996 |
| EP | 0827054 A1 | 3/1998 |
| EP | 1306188 A1 | 5/2003 |
| EP | 1327938 A1 | 7/2003 |
| WO | WO02/32649 A1 | 4/2002 |

OTHER PUBLICATIONS

INjection Molding Machine; Wikipedia; 3 pages.*
T. Richardson et al.: "Virtual Network Computing", in: IEEE Internet Computing Online, vol. 2, No. 1, 1998, pp. 33-38.
T. Richardson et la.: "The RFB Protocol" in: Real VCN ltd., Version 3.8, May 17, 2004.

* cited by examiner

PLASTICS PROCESSING MACHINE

CROSS-REFERENCES TO RELATED APPLICATIONS

This application is a continuation of prior filed copending PCT International application no. PCT/EP2005/055045, filed Oct. 6, 2005, which designated the United States and has been published but not in English as International Publication No. WO 2006/042788 and on which priority is claimed under 35 U.S.C. §120, and which claims the priority of German Patent Application, Serial No. 10 2004 051 106.3, filed Oct. 19, 2004, pursuant to 35 U.S.C. 119(a)-(d), the contents of which are incorporated herein by reference.

BACKGROUND OF THE INVENTION

The present invention relates, in general, to a plastics processing machine, and more particularly to an injection molding machine.

Nothing in the following discussion of the state of the art is to be construed as an admission of prior art.

WO 02/32649 A1 describes an injection molding apparatus, in particular for plastic materials, with at least two controllers which are connected via data output lines to a data displays, wherein the data output lines include controllable switches and wherein a control unit is provided for the switches, so that the switches in the closed state provide a connection to a main data line which leads to a common data display device. Disadvantageously, a separate control must be provided for the switches and only one data output line can be connected to the data main line at any given time.

EP 0 916 466 B1 describes an injection molding machine with an integrated operating unit, wherein an SPS of the injection molding machine and the operating unit each have a Local Area Network (LAN) interface and are connected for internal data transmission via a network line to a local network (LAN).

DE 103 10 886 B3 describes an approach for displaying information having the same content on screens associated with different computers by using the Remote Frame Buffer (RFB) protocol. The RFB protocol is described, for example, in "The RFB Protocol", Tristan Richardson, Real VCN Ltd, Version 3.8, May 17, 2004, and represents an open standard.

Conventional devices have the drawback that control of the individual elements of complex plastics processing machines, such as injection molding machines, in a coordinated fashion from a single operating unit is difficult, in particular if the machines include several subsystems, for example peripheral devices. Moreover, changes in the application software of the peripheral devices, which are frequently implemented by a device supplier, are difficult to integrate.

It would therefore be desirable and advantageous to provide a plastics processing machine, in particular an injection molding machine, and a method for operating a plastics processing machine, wherein both the machine controller and the control units of subsystems can be readily monitored and controlled, the subsystems can be easily integrated, and the machine can be universally employed.

SUMMARY OF THE INVENTION

According to one aspect of the invention, a plastics processing machine, in particular an injection molding machine, includes at least one machine controller, at least one subsystem having a dedicated control unit, and at least one operating unit having a display screen and being connected or connectable to the at least one machine controller and at least one control unit, wherein the at least one machine controller and the at least one control unit each generate an interactive screen display, enabling operation of the at least one machine controller and the at least one control unit via the corresponding interactive screen display, wherein the interactive screen display of the at least one machine controller or the at least one control unit, or both, are reproduced on the display screen of the at least one operating unit, and wherein information or commands entered on the display screen of the at least one operating unit is transmitted back to the at least one machine controller or control unit associated with the corresponding reproduced screen display of the at least one machine controller or control unit where the information was entered.

A main system of the plastics processing machine may include the at least one operating unit as well as the at least one machine controller. Subsystems may include, for example, peripheral devices which perform subtasks during the operation of a plastics processing machine, which can be separately controlled and which are frequently procured from external sources. These subsystems must be integratable in the controller of the plastics processing machine to ensure proper operation.

These subsystems may include, for example, one or several robots, which are frequently used for inserting parts into the mold of an injection molding machine or for removing finished or semi-finished injection molded parts. A conventional hot runner system with a dedicated controller can also be included or, for example, an annealing system of a type employed, for example, in a plasticizing unit of the injection molding machine. Extruders may employ take-off devices or calibration systems having their own dedicated control systems.

The plastics processing machine can have one or also several operating units which can be arranged at the different locations in relation to the plastics processing machine. For example, one operating unit may be integrated, for example, in a housing of the machine, and another operating unit may be adapted to an operator position next to the machine with a pivoting arm, or may be arranged on a separate control cabinet. The operation may also be performed from a remote operating unit, for example a PC.

According to the invention, a screen display of the at least one machine controller and the at least one operating unit can be displayed on a screen of the at least one operating unit. Essentially the entire information content of the screen display of the at least one machine controller or of the at least one control unit can therefore be displayed, optionally scaled, in its entirety on the display screen of the at least one operating unit. In other words, for example in the case of subsystems, the screen display which is normally displayed at a local operating unit of the subsystem, can now be displayed on the screen of the at least one operating unit of the plastics processing machine. To enable full operability of the at least one machine controller and the at least one control unit, these must be displayed on a single display screen to achieve full operability.

The screen display may include a display of actual values of the corresponding state of the subsystem and/or the machine controller, but may also display a control interface of the corresponding system. Any entry performed on the screen of the operating unit in the corresponding screen display, can according to the invention be transmitted back to the initial unit, i.e., the machine controller or the control unit, on whose screen display the entry was originally performed. The entry is further processed in the original unit as if the entry were performed directly on a screen associated with that original unit, so that the operation of the control unit as well as of the machine controller can now be performed from a single screen. This may be the screen directly associated with the control unit or the screen directly associated with the machine controller. Advantageously, the operation is hereby simplified because it can be performed from the screen of a single operating unit. Elimination of additional operating units of the subsystem or at least their screens represents additional savings in both space and cost.

Significant additional advantages are also attained by representing the actual image information of the corresponding displayed machine controller and/or the control unit and by having the option to control the same from a single screen of the at least one operating unit, in particular when integrating additional procured subsystems. The machine controller need not intervene when displaying information on and operating from an operating unit of the plastics processing machine, because the display, in particular of the user interfaces, is essentially performed in the original. This obviates the need for continuously updating the control software on the plastics processing machine, which to date had to coincide with upgrades of the control units of the added subsystems, so as to ensure full operability of the subsystems. Upgrades of the subsystems, in particular of the peripheral devices, can therefore be adopted and integrated retaining their full functionality, without requiring time-consuming and costly internal upgrades or changes in the machine controller.

The means for data transmission between at least one of the operating units and the at least one machine controller and the at least one control unit can be implemented in different ways. For example, a serial connection, a bus connection, or a network connection, in particular a local network (LAN), can be provided. The connection between the machine controller and the operating unit can optionally be different from the connection between the control unit and the operating unit, which may be network or bus participants. For example, the machine controller and the control unit may be connected via a CAN bus, whereas the connection between the control unit and the operating unit may be established via the Ethernet. In addition, a wireless connection can be employed, in particular between the control unit and operating unit, using conventional transmission processes, for example Bluetooth.

The connection should preferably operate in real time so as to enable a prompt reaction to the information content displayed on the screen display, and/or to enable the respective machine controller or control unit to process entries performed on the screen display in near real time.

In one exemplary embodiment, the at least one operating unit and the at least one machine controller, as well as the at least one operating unit and the at least one control unit of the plastics processing machine according to the invention can be connected via a local network (LAN). Applicable are hereby in particular field bus systems, such as the CAN bus or the Ethernet. With a low signaling rate, Ethernet operate essentially in real time, and suitable limitations, for example in the application software, can ensure that the Ethernet can operate in real time for specific applications, for example according to the principle of the Predictable Ethernet.

According to another advantageous embodiment of the invention, communication between the operating unit and the machine controller and/or between the operating unit and the control unit can be established with a conventional client-server approach. The operating unit then represents a client, and the machine controller or the control unit represent a server.

Advantageously, the screen display as well as the entry information can be transmitted between the operating unit and the machine controller and/or the control unit by using the conventional Remote Frame Buffer (RFB) protocol. Advantageously, the RFB protocol operates particularly well at a low bandwidth and places few demands on the hardware of the connected devices, for example the machine controller or the control unit and the operating unit. The RFB protocol is also an open standard which is freely available and widely distributed. It allows "remote access", i.e., remote access to so-called "graphical user interfaces" from units that are not directly connected, i.e., for example to the screen display of a control unit, a PC or an industrial computer.

When using the RFB protocol, a Remote Frame Buffer (RFB) server can run on the at least one machine controller and the at least one control unit, whereas an executable Remote Frame Buffer (RFB) client can be installed on the at least one operating unit. Upon request from the client, the server provides the server-resident screen information, i.e., the screen display to the client, where this information can then be displayed on the client's screen. User access is generally provided on the client side, wherein user entry on a screen associated with the client is transmitted from the client to the server, where it is processed. User entry at the remote operating unit is therefore processed at the server as if the entry were performed on an operating unit, for example a display screen, directly associated with the server.

In yet another advantageous embodiment, a Remote Frame Buffer (RFB) server can also be provided on at least one of the optionally several operating units of the plastics processing machine. For example, remote access may be provided on the screen display of this operating unit, which is particularly advantageous if access to the operating unit, and likewise also to the screen display of the at least one machine controller and the at least one control unit, is desired from, for example, a PC or a laptop. This approach enables remote operation.

Virtual Network Computing (VNC) can be used for conversion between the X-Windows protocol and the RFB protocol with operating systems such as Linux, Windows, RTOS, etc., which are frequently used with PCs. A VNC server can also be provided on the operating unit.

In another advantageous embodiment, the screen entries on the display of the at least one operating unit can be performed with a pointing device, such as a mouse. Key entries from a keyboard associated with the corresponding screen can advantageously also be supported.

Advantageously, screen entries on a display screen of the at least one operating unit can also be provided by a touchscreen functionality of the screen. This can obviate the need for a mouse, which is susceptive to errors and contamination, and also eliminates the need for keys. Advantageously, a limited number of separate elements can provide complete functionality of the operating unit and hence also access to the machine controller and the control units.

According to an advantageous embodiment of the present invention, several screen displays of the at least one machine controller and/or the at least one control unit can be represented and operated in different areas of the screen of the at least one operating unit. For example, when using a machine controller and three subsystems with their own control units, the screen display of the at least one operating unit can be subdivided into four areas. The screen displays of all four units can then be simultaneously displayed in different areas and monitored. Separate entries can be entered in the individual areas, for example by a touchscreen functionality. The screen display of the individual units must be scaled in accordance with the size of the screen of the operating unit. For example, the screen display of a 15" monitor with 800×600 pixel resolution on a 15" monitor of the operating unit can be displayed as a window with 640×480 pixels.

Preferably, means can be provided for switching between a display with only one screen and with several screens. For example, when several screens are displayed in parallel on the display of the operating unit, entry functionality may be disabled and may only be possible with a single screen. The means for switching may be, for example, corresponding keys in the area of the display screen of the operating unit.

In another advantageous embodiment, the screen display of the at least one machine controller and/or of the at least one control unit can be represented in an area of the display screen of the operating unit, whereas control elements can be displayed in another area. These control elements can also be actuatable, like the entry to be performed in the screen display, via keyboard, pointing device or a touchscreen functionality.

The control elements can be, for example, control elements such as off-switches which directly access the machine control or other control units and which for safety reasons should always be accessible independent of the depicted screen display for each unit. Control elements, preferably displayed in the form of icons, can also be provided, for example, for printer control, storage commands or statistic and data evaluation programs, help programs or a locking functionality for locking the operating unit. For example, a printer that is accessible via a corresponding network can be operated from the operating unit.

These control elements can be displayed in and controlled from, for example, the area defined on the screen of the operating unit by a frame or a mask surrounding the screen display of the at least one machine control and/or the at least one control unit. Preferably, the displayed and operable screen display can be selected via special control elements. In particular, when several screen displays are displayed on the screen of the operating unit in parallel, control elements that permit switching between the different display modes may also be provided.

According to yet another advantageous embodiment of the invention, remote access and hence also remote operation can be performed via an Internet connection from a remote operating unit, for example a PC or a laptop. The remote operating unit need only be able to register screen entries, either via the keyboard, a pointing device or optionally a touchscreen functionality. Either a specific RFB or VNC client or VNC viewer, or alternatively a general browser functionality, can be provided on the remote operating unit. The VNC server may include a small Web server, whereby a connection can be established with a Java-enabled Web browser and the screen display can be displayed in a Java applet and operated like with a VNC viewer. Accordingly, all screen outputs of the machine controller and/or of the controlled units can be displayed and screen entry can be performed with the Java applet or the VNC viewer which is available as freeware.

The means for data transmission provided between the at least one machine controller and the at least one subsystem having its own control unit can be connected conventionally to the Internet, optionally by providing suitable security features, such as a firewall or suitable authentication. Depending on the data transmission means, for example a hub, a gateway computer, a modem or similar equipment required for LAN (local area), WAN (wide area), GAN (global area), WLAN (wireless local area) networks can be employed. This type of access to the plastics processing machine and its subsystems is particularly advantageous for maintenance and initial setup as well as for enabling support from the manufacturer of subsystems or the plastics processing machine in the event of a malfunction, since remote diagnostics is already possible without having to transmit additional specific data of the plastics processing machine or subsystems to the remote operating unit, for examples the PC of a service technician. In particular, support is then continuously available independent of particular modifications in the control software of the different units, because the full information content of the screen display can be displayed, screen entry is unrestricted and the respective unit is therefore fully operational.

According to another aspect of the invention, a method for operating a plastics processing machine having at least one operating unit, at least one machine controller, and at least one subsystem having a dedicated control unit, wherein the at least one machine controller and the control unit of the at least one subsystem each generate a screen display and are operable via the screen display, includes the steps of transmitting the screen display of the at least one machine controller or the control unit, or both, to the at least one operating unit, reproducing the transmitted screen display on a display screen of the at least one operating unit, entering information on the reproduced screen display on the display screen of the at least one operating unit, transmitting the entered information back to the corresponding machine controller or control unit associated with the reproduced screen display where the information was entered, and processing the entered information with the corresponding machine controller or control unit.

A method for operating a plastics processing machine according to the invention can include providing corresponding protocols on the CPUs of the respective operating units, machine controllers and control units.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
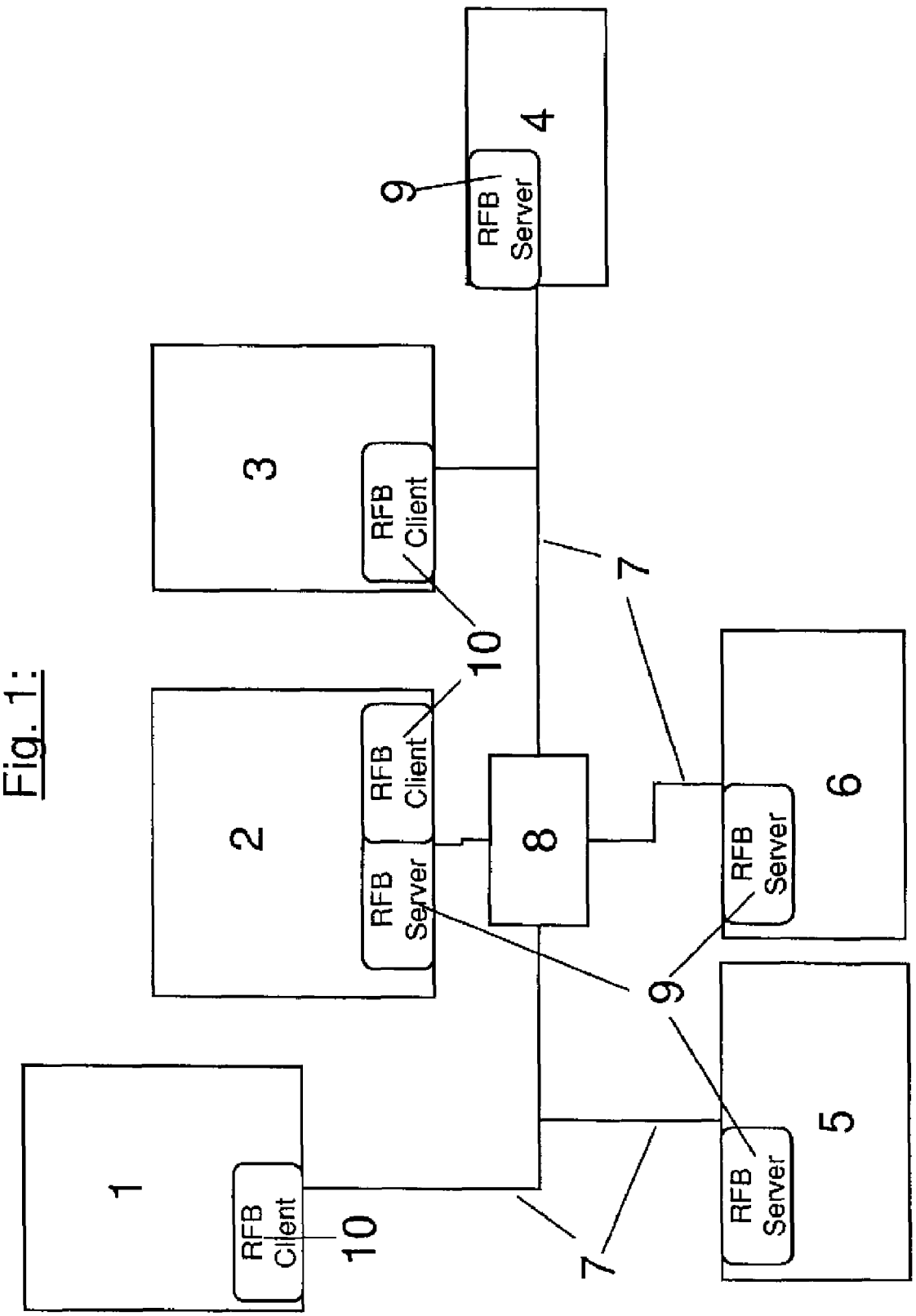
FIG. 1 shows schematically an injection molding machine with several operating units, a machine controller and control units of subsystems.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of an injection molding machine according to the invention with operating units 2, 3, a machine controller 4, and control units of subsystems, for example a hot runner control 5 and a robot control 6 which are interconnected by suitable data lines 7 and are also connected via a hub (or switch) 8 with a local network (LAN). An executable RFB server 9 is installed on the units 2, 4, 5, 6, whose screen display can be centrally displayed or remotely accessed. An executable RFB client 10 is installed on the operating units 2, 3, on which the screen display of the subsystems 5, 6 and of the machine controller 4 can be displayed A RFB client 10 is also running on the remote PC 1 which is connected in a conventional manner via hub 8. A RFB server 9 is running on a main operating unit 2 in addition to a RFB client 10. The screen output of this unit can be transmitted via the RFB server 9 to other operating unit 3 installed at other locations on the injection molding machine, or to remote maintenance locations, such as PC 1.

Figure 2:
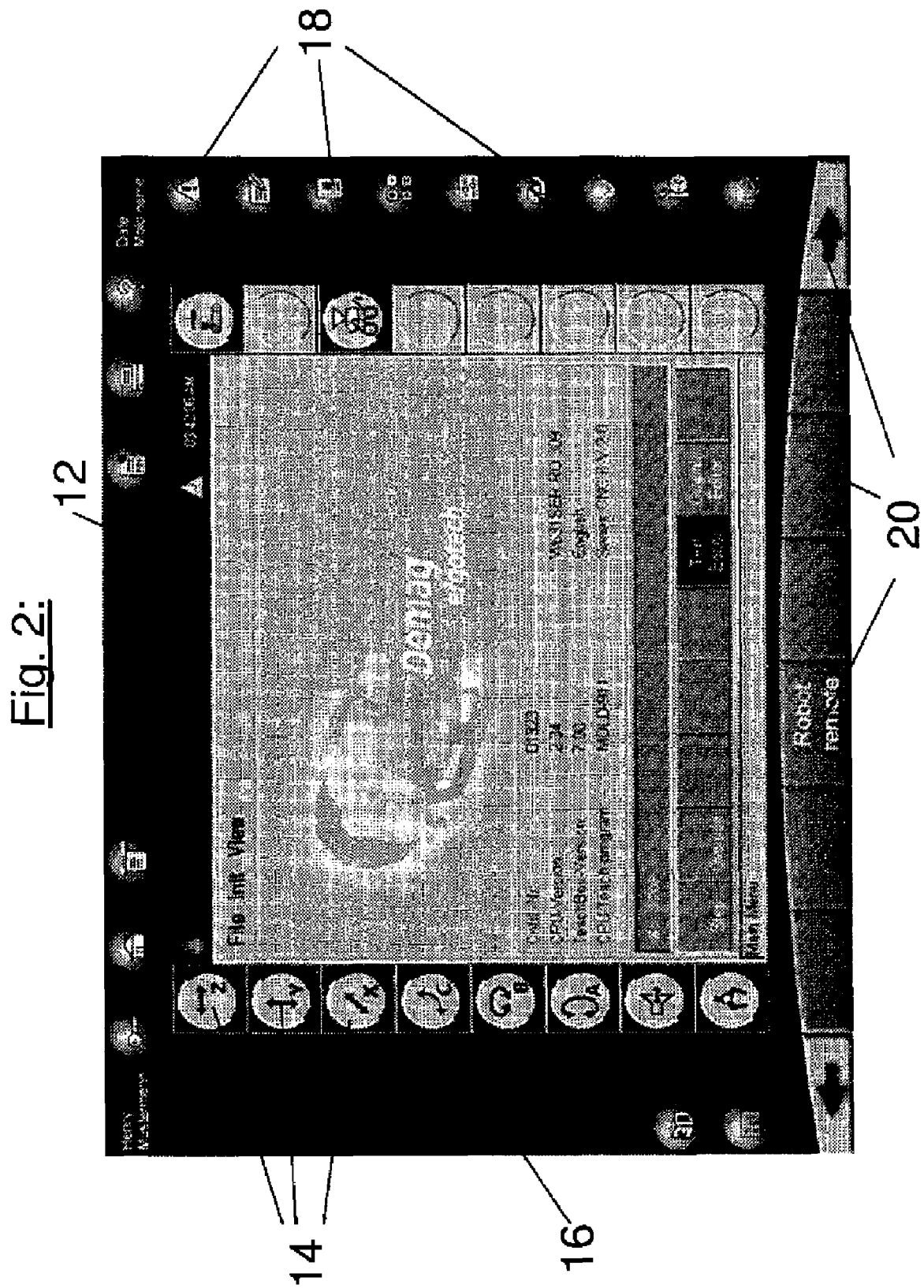
FIG. 2 shows a screen interface of a display screen of an operating unit of an injection molding machine according to the invention.

FIG. 2 shows an exemplary screen output of the operating unit 2 which can be displayed in this form also on the screens of PC 1 or of the other operating unit 3 with the RFB server 9 via the provided RFB clients 10 by using the RFB protocol. The complete screen output of the control unit of a subunit, for example of the robot control 6, is displayed in an interior area 12. All elements on this display can be controlled by a touchscreen functionality, and the corresponding entry information can be transmitted back to the control unit using the RFB protocol. Actuation of one of the buttons 14 can be transmitted back to the control unit of the robot 6, where the corresponding command can be processed.

Control elements 18, 20 are depicted in a reserved frame region 16 of the screen output of the operating unit 2, which enable, for example, activation of various functions of the machine controller 4, switching between different screen display modes in the interior region 12, accessing help functions, storing screen displays, as well as statistical evaluation of process parameters.

With remote access to the screen display of the operating unit 2, the user obtains access to the screen display in the interior region 12 as well as to the control elements 18, 20 provided in the frame 16, and has thereby complete access to the injection molding machine, including its subsystems.

Figure 3:
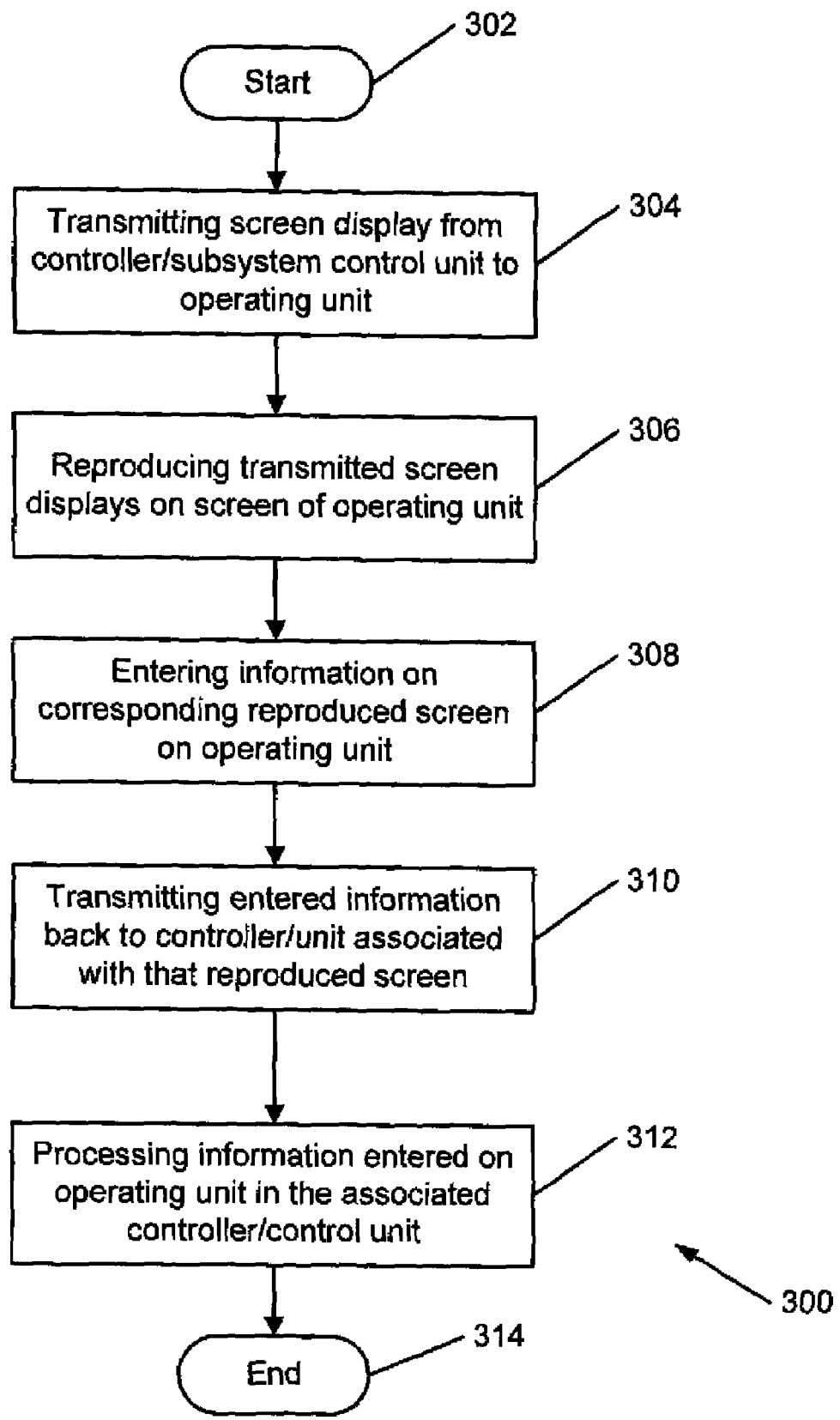
FIG. 3 is a process flow diagram of a process for operating the plastics processing machine of FIG. 1.

FIG. 3 is a process flow diagram of a process 300 for operating the plastics processing machine of FIG. 1. Process 300 starts at step 302. At step 304, the screen display(s) displayed on a machine controller and/or a control unit of the subsystem is/are transmitted to an operating unit, and the transmitted screen display(s) is/are reproduced, for example, in the form of windows, on the display screen of the operating unit, at step 306. Information can then be entered, for example, by a user, on a corresponding reproduced screen of the operating unit, at step 308. The entered information is then transmitted back to the particular controller or control unit which is associated with that screen, at step 310. The back-transmitted information is then processed at the associated controller or control unit, at step 312. Process 300 ends at step 314.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A plastics processing machine comprising:
at least one machine controller,
at least one subsystem having a dedicated control unit, and
at least one operating unit having a display screen and being connected or connectable to the at least one machine controller and at least one control unit for data transmission, wherein the at least one machine controller and the at least one control unit each generate an interactive screen display, enabling operation of the at least one machine controller and the at least one control unit via the corresponding interactive screen display,
wherein the interactive screen display of the at least one machine controller or the at least one control unit, or both, are reproduced on the display screen of the at least one operating unit, and
wherein information or commands entered on the display screen of the at least one operating unit is transmitted back to the at least one machine controller or control unit associated with the corresponding reproduced screen display of the at least one machine controller or control unit where the information was entered,
wherein the screen display at least of a control unit and corresponding entry information is transmitted with a Remote Frame Buffer (RFB) protocol.

2. The plastics processing machine of claim 1, wherein the at least one operating unit, the at least one machine controller and the at least one control unit are networked or can be networked via a local network (LAN).

3. The plastics processing machine of claim 2, wherein the LAN includes an Ethernet or a field bus connection.

4. The plastics processing machine of claim 1, wherein the at least one machine controller or the at least one control unit, or both, further comprise a Remote Frame Buffer (RFB) server, and the at least one operating unit further comprises a Remote Framed Buffer (RFB) client.

5. The plastics processing machine of claim 4, wherein at least one operating unit further comprises a Remote Frame Buffer (RFB) server.

6. The plastics processing machine of claim 4, further comprising Virtual Network Computing (VCN) for conversion between an X-Windows protocol and the RFB protocol.

7. The plastics processing machine of claim 1, wherein the entry on the screen display of the at least one operating unit can be entered by using a pointing device.

8. The plastics processing machine of claim 7, wherein the pointing device comprises a mouse.

9. The plastics processing machine of claim 1, wherein the entry on the screen of the at least one operating unit can be entered by using a touchscreen functionality of the display screen.

10. The plastics processing machine of claim 1, wherein several screen displays of the at least one machine controller or of the at least one control unit, or both, are displayed in or operable from, or both, different regions of the screen display of the at least one operating unit.

11. The plastics processing machine of claim 1, wherein the interactive screen display of the at least one machine controller or of the at least one control unit, or both, are displayed in a first region of the screen display of the at least one operating unit, and wherein control elements are displayed in a second region different from the first region.

12. The plastics processing machine of claim 1, further comprising a remote control for connection via the Internet to a remote operating unit.

13. The plastics processing machine of claim 12, wherein the remote operating unit comprises a personal computer (PC).

14. The plastics processing machine of claim 1, wherein the at least one subsystem comprises a robot, a hot channel system or an annealing unit, or a combination thereof.

15. The plastics processing machine of claim 1, wherein the plastics processing machine is implemented as an injection molding machine.

* * * * *